United States Patent
Amagai

(10) Patent No.: US 8,028,112 B2
(45) Date of Patent: Sep. 27, 2011

(54) I/O DEVICE, NETWORK SYSTEM WITH I/O DEVICE AND COMMUNICATION METHOD IN NETWORK SYSTEM WITH I/O DEVICE

(75) Inventor: Akihiro Amagai, Tokyo (JP)

(73) Assignee: Sanrita Automation Co., Ltd. (JP)

( * ) Notice: Subject to any disclaimer, the term of this patent is extended or adjusted under 35 U.S.C. 154(b) by 239 days.

(21) Appl. No.: 12/305,026

(22) PCT Filed: Aug. 7, 2006

(86) PCT No.: PCT/JP2006/315981
§ 371 (c)(1),
(2), (4) Date: Dec. 16, 2008

(87) PCT Pub. No.: WO2007/148416
PCT Pub. Date: Dec. 27, 2007

(65) Prior Publication Data
US 2009/0177811 A1 Jul. 9, 2009

(30) Foreign Application Priority Data

Jun. 22, 2006 (JP) .................................. 2006-172474

(51) Int. Cl.
*G06F 13/28* (2006.01)
*G06F 13/00* (2006.01)
(52) U.S. Cl. ............ 710/110; 710/105; 710/20; 710/31; 710/61
(58) Field of Classification Search .................. 710/110, 710/105–106, 20–21, 31–34, 61
See application file for complete search history.

(56) References Cited

U.S. PATENT DOCUMENTS

| 3,789,653 | A | * | 2/1974 | Brejaud ............................ 73/1.45 |
| 4,807,259 | A | * | 2/1989 | Yamanaka et al. ............. 375/358 |
| 5,579,513 | A | * | 11/1996 | Strohmer ...................... 713/600 |
| 6,470,458 | B1 | * | 10/2002 | Dreps et al. ................... 713/400 |
| 7,210,052 | B2 | * | 4/2007 | Lee et al. ........................ 713/500 |
| 7,340,630 | B2 | * | 3/2008 | Morris et al. ................. 713/400 |
| 7,634,604 | B2 | * | 12/2009 | Mukherjee .................... 710/266 |

(Continued)

FOREIGN PATENT DOCUMENTS

JP 51-13974 5/1993

(Continued)

*Primary Examiner* — Christopher B Shin
(74) *Attorney, Agent, or Firm* — Schmeiser, Olsen & Watts, LLP

(57) ABSTRACT

An I/O device is provided to accurately synchronize clocks between nodes to have a device driving signal directly made out from the clocks, so that operation timing can be synchronized between the nodes regardless of a processing flicker on a host computer and a delay in a communication channel, and so that sending and receiving of a communication frame between the nodes, updating of contents of the communication frame, etc. can be efficiently performed. The I/O device comprises receiving means for receiving information including at least contents instructing an input and output time to a device, time tag generating means for generating a time tag indicative of the input and output time included in the received signal to output the same to device control means, and clock means for generating a clock signal indicative of the present time, wherein the device control means compares the input and output time indicated by the time tag output from the time tag generating means with the present time indicated by the clock signal output from the clock means to output designated data to a device or input data from the device at the input and output time.

6 Claims, 15 Drawing Sheets

U.S. PATENT DOCUMENTS

| | | | |
|---|---|---|---|
| 2004/0049706 A1* | 3/2004 | Strong | 713/400 |
| 2004/0213367 A1* | 10/2004 | Han | 375/354 |
| 2006/0013208 A1* | 1/2006 | Rietschel et al. | 370/389 |
| 2006/0080575 A1* | 4/2006 | Golparian | 714/12 |
| 2008/0229152 A1* | 9/2008 | Moroda | 714/38 |
| 2009/0019459 A1* | 1/2009 | Rowan et al. | 719/328 |
| 2010/0100905 A1* | 4/2010 | Sequeira | 725/39 |
| 2010/0209070 A1* | 8/2010 | Inomata | 386/66 |
| 2010/0223487 A1* | 9/2010 | Foerster et al. | 713/500 |

FOREIGN PATENT DOCUMENTS

| | | |
|---|---|---|
| JP | 2002-319971 | 10/2002 |
| JP | 2003-338841 | 11/2003 |
| JP | 2005-110055 | 4/2005 |

* cited by examiner

FIG. 8

| cell | 0 | 1 | 2 | 3 | 4 | 5 | 6 | 7 | 8 | 9 | 10 | ooo | 31 |
|---|---|---|---|---|---|---|---|---|---|---|---|---|---|
| | MASTER NODE 21 | | PASSIVE NODE 22 | | PASSIVE NODE 23 | | ACTIVE NODE 24 | | | | | | |
| frame 0 | S | S | S | S | S | S | S | S | S | S | S | ooo | S |
| frame 1 | M | M | I1 | I1 | I2 | I2 | I3 | I3 | 0 | 0 | 0 | ooo | 0 |
| frame 2 | M | M | I1 | I1 | I2 | I2 | I3 | I3 | 0 | 0 | 0 | ooo | 0 |
| frame 3 | M | A1 | A1 | A1 | A2 | A2 | A3 | A3 | 0 | 0 | 0 | ooo | 0 |
| frame 4 | M | A1 | A1 | A1 | A2 | A2 | A3 | A3 | 0 | 0 | 0 | ooo | 0 |

| | |
|---|---|
| S | SYNCHRONIZATION INFORMATION |
| Ix | ISOCHRONOUS DATA NODE x SHOULD RECEIVE |
| 0 | UNUSED FIXED LENGTH DATA |
| M | BROADCAST ASYNCHRONOUS DATA FROM MASTER NODE 21 |
| Ax | ASYNCHRONOUS DATA NODE x SHOULD RECEIVE |

| cell | MASTER NODE 21 | | PASSIVE NODE 22 | | PASSIVE NODE 23 | | ACTIVE NODE 24 | | | | | |
|---|---|---|---|---|---|---|---|---|---|---|---|---|
| | 0 | 1 | 2 | 3 | 4 | 5 | 6 | 7 | 8 | 9 | 10 | ... 31 |
| frame 0 | 0 | 0 | 0 | ST3 | 0 | 0 | 0 | 0 | 0 | 0 | 0 | ... 0 |
| frame 1 | 0 | 0 | 0 | 0 | 0 | 0 | I3 | I3 | 0 | 0 | 0 | ... 0 |
| frame 2 | 0 | 0 | 0 | 0 | 0 | 0 | I3 | I3 | 0 | 0 | 0 | ... 0 |
| frame 3 | 0 | 0 | 0 | 0 | 0 | 0 | A3 | A3 | 0 | 0 | 0 | ... 0 |
| frame 4 | 0 | 0 | 0 | 0 | 0 | 0 | A3 | A3 | 0 | 0 | 0 | ... 0 |

| STx | STATUS INFORMATION OF NODE x | | Ax | ASYNCHRONOUS DATA GENERATED BY NODE x |
|---|---|---|---|---|
| Ix | ISOCHRONOUS DATA GENERATED BY NODE x | | 0 | UNUSED FIXED LENGTH DATA |

FIG. 13

I/O DEVICE, NETWORK SYSTEM WITH I/O DEVICE AND COMMUNICATION METHOD IN NETWORK SYSTEM WITH I/O DEVICE

TECHNICAL FIELD

Present invention relates to an I/O device, a network system with an I/O device, and a communication method of an I/O device, and particularly to an I/O device that enables a device to be driven in synchronization with time, a network system with an I/O device that allows clocks between nodes to be precisely synchronized, and a communication method of an I/O device that can be treated as in the case of a bus.

BACKGROUND ART

There is a device driving system in which a host computer sends a command to a plurality of I/O nodes that drive an I/O device, and each of the I/O nodes that has received the command interprets the command and drives a corresponding I/O device.

However, in this method, if a processing flicker occurs on a host computer, that flicker is directly transformed into a flicker of a command issue time, causing it hard to issue a command at a precise time.

Also, since a communication channel inevitably has delay, it takes some time for a command to reach the remote side (an I/O node). Furthermore, there is often a flicker in a delay time of a communication channel, causing a flicker in the time in which a command reaches a remote side. If a device is driven by a software process or the like at a remote side, this flicker in a processing time at a remote side takes a form of a flicker in a device driving time.

Particularly, when a temporally-continuous control is performed, since each I/O node operates with its own internal crystal oscillator, time errors (caused by a frequency error of a crystal oscillator) accumulate, causing an operation timing error between nodes to increase with time.

Furthermore, in a traditional method, although data to be output is directly written to an output target device, since driving timing of an output device is generated by a CPU, time accuracy is low.

Also, in a traditional method, an intended frequency is obtained by dividing a frequency of a crystal oscillator that each node has. However, just dividing a frequency of an oscillator causes a phase to be uncertain, and there is also a problem that frequency errors of a crystal oscillator accumulate.

For a traditional point-to-point communication, as represented by an Ethernet®, a star topology is generally used. In this case, since data processing is performed on a communication frame basis, and transmission of a communication frame is performed in a store-and-forward manner, a whole communication frame needs to be received at a hub before data transfer from the hub to a neighboring node can be started. Also, timing at which each node generates a communication frame is not controlled.

This star topology has a disadvantage that an amount of wiring becomes large. Also, since an Ethernet has only one check code for a whole frame, it cannot be determined whether an error exists or not until a whole communication frame is received, and in order to rewrite the content of a communication frame and transmit the communication frame, a sequence of receiving a whole communication frame, rewriting the content of the communication frame, and sending the communication frame is needed. Thus, it takes a lot of time to pass through a node. Also, since timing at which a communication frame is generated is not controlled, there is a problem that it is not possible to ensure that a communication frame reaches the remote side within a given time.

Furthermore, in a traditional method, a communication delay is measured by sending a communication frame back and forth between the nodes at which a communication delay is to be measured. In such a measuring method, although a communication delay between two points can be measured, a communication delay at an intermediate point between the two nodes cannot be measured, so measurement needs to be iterated as much as the number of nodes that are needed.

[Patent Document 1] Japanese Patent Publication No. 51-13974

DISCLOSURE OF THE INVENTION

Problems to be Solved by the Invention

The present invention has been made in view of various problems in a traditional method described above, and the object of the present invention is to provide an I/O device, a network system with an I/O device, and a communication method of an I/O device that accurately synchronize clocks between nodes to have a device driving signal directly made out from the clocks, so that operation timing can be synchronized between the nodes regardless of a processing flicker on a host computer and a delay in a communication channel, and so that sending and receiving of a communication frame between the nodes, updating of contents of the communication frame, etc. can be efficiently performed.

Means for Solving the Problems

In order to address the above-described problems, the present invention proposes an I/O device having device control means for controlling input and output of data to a device, characterized in that the I/O device comprises receiving means for receiving information including at least contents instructing an input and output time to the device, time tag generating means for generating a time tag indicative of the input and output time included in the information received at the receiving means to output the same to the device control means, and clock means for outputting a clock signal indicative of the present time, wherein the device control means can, by comparing the input and output time indicated by the time tag output from the time tag generating means with the present time indicated by the clock signal output from the clock means, output designated data to the device or input data from the device at the input and output time.

Also, in order to address the above-described problems, the present invention proposes an I/O device having device control means for controlling output of pulse to a device, characterized in that the I/O device comprises receiving means for receiving data including contents instructing a start time and an interval of pulse output to the device, tagging means for putting a time tag indicative of the start time and the interval of pulse to the data received at the receiving means to output the data to the device control means, and clock means for outputting a clock signal indicative of the present time, wherein the device control means can, by comparing the start time of pulse indicated by the time tag of the data output from the tagging means with the present time indicated by the clock signal output from the clock means, start outputting pulse to the device at the start time and output successive pulse according to the interval of pulse indicated by the time tag of the data output from the tagging means.

Also, a network system with an I/O device according to the present invention for addressing the above-described problems is characterized in that the network system comprises a master node composed of an I/O device including a clock and one or more slave nodes composed of an I/O device including a clock synchronized with the time of the clock included in the I/O device of the master node.

Also, a communication method in a network system with an I/O device according to the present invention for addressing the above-described problems is characterized in that, in a network system where a plurality of I/O devices are connected in a daisy chain, a master node and a terminal slave node are active nodes and other intermediate slave nodes are passive nodes, and generation of a communication frame is performed at the active nodes only.

Preferably, a communication frame generated at the master node and a communication frame generated at the terminal active node are flowed to the communication channel concurrently in opposite directions.

Also preferably, the passives nodes each read necessary data from the communication frame passing therethrough as well as write output data thereof.

Also, it is preferable that the slave node internally retains time stamps of a communication frame moving back and forth between the master node and the slave node, the communication frame including time information about the difference between the time at which the communication frame is received at the master node and the time at which that communication frame is sent from the master node for next time, and the slave node calculating a communication delay between itself and the master node from time stamps of when the communication frame passed therethrough and the time information.

Also preferably, the communication frame includes one or more fixed length data to which data and an error correcting code are appended and is processed on the fixed length data basis.

ADVANTAGES OF THE INVENTION

The present invention is as described above, and according to the present invention, there is an advantage that indeterminacy of driving timing of a remote I/O device caused by processing speed of a communication channel and a host computer and software on a remote side can be eliminated, and timing errors thus do not accumulate even when long-term successive I/Os are performed.

Also, since operation timing of a device depends only on time, a device can operate at precise timing without being affected by a processing time of communication and software. By generating a device driving clock based on a time, not only a frequency but also a phase can be uniquely determined from time.

Compared to a communication channel in a bus, a higher-speed communication channel can be used. Compared to a star topology, an amount of wiring is decreased. Even though a point-to-point connection is used, data can be broadcasted as in the case of a bus. Nodes can thus communicate each other without going through a master.

A communication delay time and a communication band are ensured, and since a band for communication of isochronous data is reserved in advance and free band is allocated for asynchronous data, communications of isochronous data and asynchronous data can co-exist. The time to take to pass through a node is significantly decreased compared to a store-and-forward type switch.

Since only time stamp data processed within a master node is transferred for measuring a communication delay, it doesn't need to allocate a lot of band for communication delay measurement.

BEST MODE FOR CARRYING OUT THE INVENTION

The best mode for carrying out the invention will now be described with reference to the accompanying drawings. FIGS. 1 to 3 are diagrams for describing an I/O device according to the present invention, and FIGS. 6 to 17 are diagrams for describing a network system with an I/O device according to the present invention and a communication method of a network system with the I/O device.

First, an I/O device according to the present invention will be described with reference to FIGS. 1 and 2. FIG. 1 is a block diagram showing hardware configuration of an I/O device according to the present invention. An I/O device 1 includes a CPU 2, a memory 3 for storing programs run on the CPU 2 and data used by the CPU 2, a communication control portion 4 which is controlled by the CPU 2 and communicates with other I/O device on a network, an analogue I/O 5, a digital I/O 6, and a clock portion 7.

While the communication control portion 4, the analogue I/O 5, the digital I/O 6, and the clock portion 7 are each connected with an internal bus, another bus connects the control portion 4, the analogue I/O 5, and the digital I/O 6 to the clock portion 7, respectively.

The I/O device 1 is connected to a network via the communication control portion 4, constitutes a node on the network, and performs data communication with other I/O devices constituting the nodes on the network.

The steps of a process performed in the communication control portion 4 when performing data communication with other I/O devices constituting nodes on a network is shown in FIG. 2. The communication control portion 4 performs, in data communication with other I/O devices connected to the network, functions of receiving data and controlling the data communication, and includes a decode portion 11 for decoding data received, a data divide portion 12 for dividing the data into processing data and transfer data, a data sort portion 13 for sorting the processing data into asynchronous data and isochronous data, a data combine portion 14 for combining the processed asynchronous data and isochronous data, a data embed portion 15 for embedding the combined data in the transfer data, and an encode portion 16 for encoding the transfer data.

When data is received from other I/O device connected to a network, the received data is first sent to the decode portion 11. The decode portion 11 decodes the received data and sends the decoded data to the data divide portion 12.

On receiving the data from the decode portion 11, the data divide portion 12 extracts from that data the processing data assigned to be processed at its own I/O device, sends the same to the data sort portion 13, and then sends the data from which the processing data has been extracted to the data embed portion 15 as transfer data.

On receiving the processing data from the data divide portion 12, the data sort portion 13 sends asynchronous data to the CPU 2 if the processing data is asynchronous data or isochronous data to the analogue I/O 5 or the digital I/O 6 if the processing data is isochronous data.

Meanwhile, as the data processed at their own I/O devices, the analogue I/O 5 or the digital I/O 6 sends isochronous data and the CPU 2 sends asynchronous data to the data combine portion 14. On receiving the isochronous data from the analogue I/O 5 or the digital I/O 6 and the asynchronous data from the CPU 2, the data combine portion 14 sends the combined data that combined those data to the data embed portion 15.

The data embed portion 15 receives the transmit data from the data divide portion 12 and the combined data from the data combine portion, and embeds the combined data in the transmit data to send the resulting data to the encode portion 16. On receiving the data from the data embed portion 15, the encode portion 16 encodes that data and sends the encoded data to other I/O device.

The analogue I/O 5 and the digital I/O 6 are for controlling timing of input and output of data between devices connected to the I/O device 1. If a device which is driven based on the content of input data is connected, the analogue I/O 5 and the digital I/O 6 output data needed to drive the device. If a device which is driven based on input external pulse is connected, the analogue I/O 5 and the digital I/O 6 output pulse needed to drive the device.

If a device which is driven by the content of input data is connected, data input to the analogue I/O 5 or the digital I/O 6 is the data needed to drive that device, and the data has a time tag put thereto that defines the time to output data to the device.

The analogue I/O 5 and the digital I/O 6 output the data of the input data except a time tag to a device. The input data is divided into a data body and a time tag, and the data body is retained without being output and the time tag is sent to a built-in comparator which is not shown.

The comparator has input data indicative of the present time that is constantly output from the clock portion 7. When a time tag is sent to the comparator, comparison of the time to output data to the device defined in that time tag with the present time starts. When the output time comes, the retained data is output to the device.

If a device which is driven by external pulse is connected, data input to the analogue I/O 5 or the digital I/O 6 is the data including content indicative of a start time and an interval of pulse output to the device.

The analogue I/O 5 or the digital I/O 6 compares the defined start time of pulse with the present time, and when the start time comes, outputs pulse to the device. The analogue I/O 5 or the digital I/O 6 then compares the time defined by the defined pulse interval with the elapsed time from the time when the pulse started to the present time, and when the time defined by the pulse interval elapsed, iterates a process of outputting next pulse to the device.

The outline of a network system with an I/O device according to the present invention will now be described with reference to FIG. 3. A network system with the present I/O device forms a network system composed of a network where a plurality of I/O devices are connected in a daisy chain by a twist pair cable, a coaxial cable, an optical fiber cable, etc.

I/O devices constituting the present network system are classified into one master node and one or more slave nodes. The master node includes a clock portion as a synchronization source and can supply a synchronous communication frame based on that clock portion to the slave nodes.

Of the slave nodes, the one that is located at the end of a network and can self-generate a communication frame to supply to an upstream node becomes an active node, and rest of the slave nodes become passive nodes.

In the example shown in FIG. 3, a node 21 which has a clock portion as a synchronization source is a master node. The nodes located at the end of a network except the node 21 become active nodes. In the example shown in FIG. 3, a node 24 is an active node.

Each of the rest of the nodes becomes a passive node to the master node and the active node. In the example shown in FIG. 3, each of the nodes except the master node 21 and the active node 24, that is, the nodes 22 and 23, is a passive node to the master node 21 and the active node 24.

Also, each of the nodes except the master node 21 becomes a slave node to the master node 21, and each slave node can be synchronized with a synchronous communication frame supplied from the master node using a clock portion included therein.

As described above, the present network system is configured such that the master node 21 supplies a synchronous communication frame to the other nodes 22 to 24, and each of the nodes is synchronized with the synchronous communication frame to perform operations such as control of devices.

Also, as shown in FIG. 3, the master node 21 has a host computer 25 for controlling the master node 21 connected thereto, and each of the nodes 22 to 24, which is a slave node, has a device 26 to be controlled and, as needed, a terminal 27 connected thereto.

A communication method in a network system with an I/O device according to the present invention will now be described with reference to FIGS. 4 to 17. First, a communication frame used in the present communication method will be described with reference to FIG. 4.

In the present communication method, a process is iterated based on the number of communication frames determined in the computer 25 connected to the master node 21. Hereinafter, each iteration of the process will be called one cycle.

Also, one communication frame is composed of one or more fixed length data, and one fixed length data is composed of data and an error correcting code. The error correcting code is redundant data appended aside from original data for correcting errors of data when reading data.

The general flow of the present communication method with a communication frame having the above-described configuration will now be described with reference to FIG. 5. A communication frame generated at the master node 21 is sent toward the active node 24. Also, a communication frame generated at the active node 24 is sent toward the master node 21.

Hereinafter, a communication frame going from the master node 21 toward the active node 24 will be called a downward communication frame, and a communication frame generated from the active node 24 and going toward the master node 21 will be called an upward communication frame.

The passive nodes 22 and 23 located between the master node 21 and the active node 24 do not generate a communication frame by themselves. The passive nodes 22 and 23 embed the data they want to send in communication frames generated from the master node 21 and the active node 24 to pass to neighboring nodes. An upward communication frame and a downward communication frame are generated in sync.

For example, the passive node 22 obtains data submitted by the master node 21 at a downward communication frame f1 and data submitted by the active node 24 and the passive node 23 at an upward communication frame f2.

Also, the passive node 23 obtains data submitted by the master node 21 and the passive node 22 at the downward communication frame f1 and data submitted by the active node 24 at the upward communication frame f2. By adding up the contents of an upward communication frame and a downward communication frame, each node can obtain data of all nodes.

Generation of a communication frame at the master node 21 and the active node 24 are performed concurrently. The passive nodes 22 and 23 embed the data thereof while reading a communication frame passing therethrough. This process is performed against both an upward and a downward communication frames, with the master node 21 and the active node 24 finally collecting data.

FIG. 6 is a diagram showing propagation of communication frames for one cycle. In this diagram, a white circle, square, and triangle represent each of communication frames flowing from the master node 21 to active node 24. In this case, three communication frames of a white circle, square, and triangle make up one cycle. Same is true with a black circle, square, and triangle which represent communication frames flowing from the active node 24 to the master node 21.

The process performed at the passive nodes 22 and 23 against a communication frame in the above-described present communication method will now be described with reference to FIG. 7. The passive nodes 22 and 23 embed the send data thereof in an area where each of them have reserved to distribute the same in both upward and downward directions.

In a downward communication frame, data is filled from the leading-end fixed length data, and in an upward communication frame, data is filled from the trailing-end fixed length data. By combining the both communication frames, data from all nodes can be collected.

The process that the passive nodes 22 and 23 perform against an upward communication frame and a downward communication frame will now be described in detail. FIG. 8 is a diagram showing examples of downward communication frames output from the master node 21. In this figure, frame 0 is a communication frame used for synchronization information only. Each node performs assignment of fixed length data, specifying from which number of fixed length data to which number of fixed length data within a frame the node uses.

Of the fixed length data in the downward communication frames shown in FIG. 8, the ones the passive node 22 receives are shown in FIG. 9. In this figure, the fixed length data shown in gray are the fixed length data received by the passive node 22. Of these fixed length data, the ones the passive node 22 processes are shown in FIG. 10. In this figure, the fixed length data shown in gray are the fixed length data rewritten at the passive node 22. Each node writes the data it wants to submit to the fixed length data assigned thereto to pass to the next node. FIG. 11 is a diagram showing the fixed length data the passive node 23 receives in that downward communication frame, wherein the fixed length data shown in gray are the fixed length data received by the passive node 23.

FIG. 12 is a diagram showing upward communication frames from the active node 24. In this figure, each node embeds a status in a frame 0 at the position where a position of fixed length data equals the ID thereof. Also, each node writes the output data thereof in the range of the fixed length data assigned thereto. Of the fixed length data in the communication frames shown in FIG. 12, the ones the passive node 23 receives are shown in FIG. 13. In this figure, the fixed length data shown in gray are the fixed length data received by the passive node 23.

FIG. 14 is a diagram showing a flow to the start of communication in the present communication method, and FIG. 15 is a diagram showing scanning of nodes performed by the master node 21. The master node 21 generates a list of nodes existing on a network by performing an operation similar to a ping in IP communication.

On receiving a communication frame whose TTL is 1, each node transfers that communication frame to a receive buffer thereof. If the TTL of the communication frame received is higher than 1, the TTL is decremented and the communication frame is transferred to the next node. If the TTL of the communication frame received is 0, the communication frame is discarded.

The master node 21 increments a TTL to 1, 2, 3, and so on, and at the point where a reply is no longer returned, recognizes that point as a terminal node. FIG. 15 shows a process performed when the number of slave nodes is 2 (a passive node and an active node). In that case, since a reply is not returned with a communication frame whose TTL is set to 3, the master node 21 learns that there are only two slave nodes.

Also, a reply communication frame has an identifier unique to each node and a timestamp included therein. This enables the master node 21 to learn which node is connected at how many hops away therefrom with how much communication delay.

The clock portion 7 of the I/O device 1 constituting each slave node is timed according to a synchronous communication frame sent from the master node 21. As shown in FIG. 16, the clock portion 7 of the I/O device 1 adjusts the time, comparing the data included in a synchronization frame and a receive time stamp indicative of the timing at which the synchronization frame is received.

FIG. 17 is a diagram showing a communication delay measuring method used after communication started in a network system with an I/O device according to the present invention. This method is the method that uses only a synchronous communication frame to measure communication delays of all nodes concurrently. In this diagram, if a send time stamp is represented as T, a receive time stamp represented as R, and an elapsed time from the time of a receive time stamp R to the time of a send time stamp T at the master node 21 represented as a, a communication delay time is (R−T−a)/2.

Although the present invention has been described in some detail using the most preferred embodiment, since it is obvious that a wide variety of embodiments can be configured without going against the spirit and scope of the present invention, the present invention is not restricted to that particular embodiment except being limited in the appended claims.

BRIEF DESCRIPTION OF THE DRAWINGS

FIG. 8 is a diagram showing examples of communication frames output from a master node 21;

Figure 9:
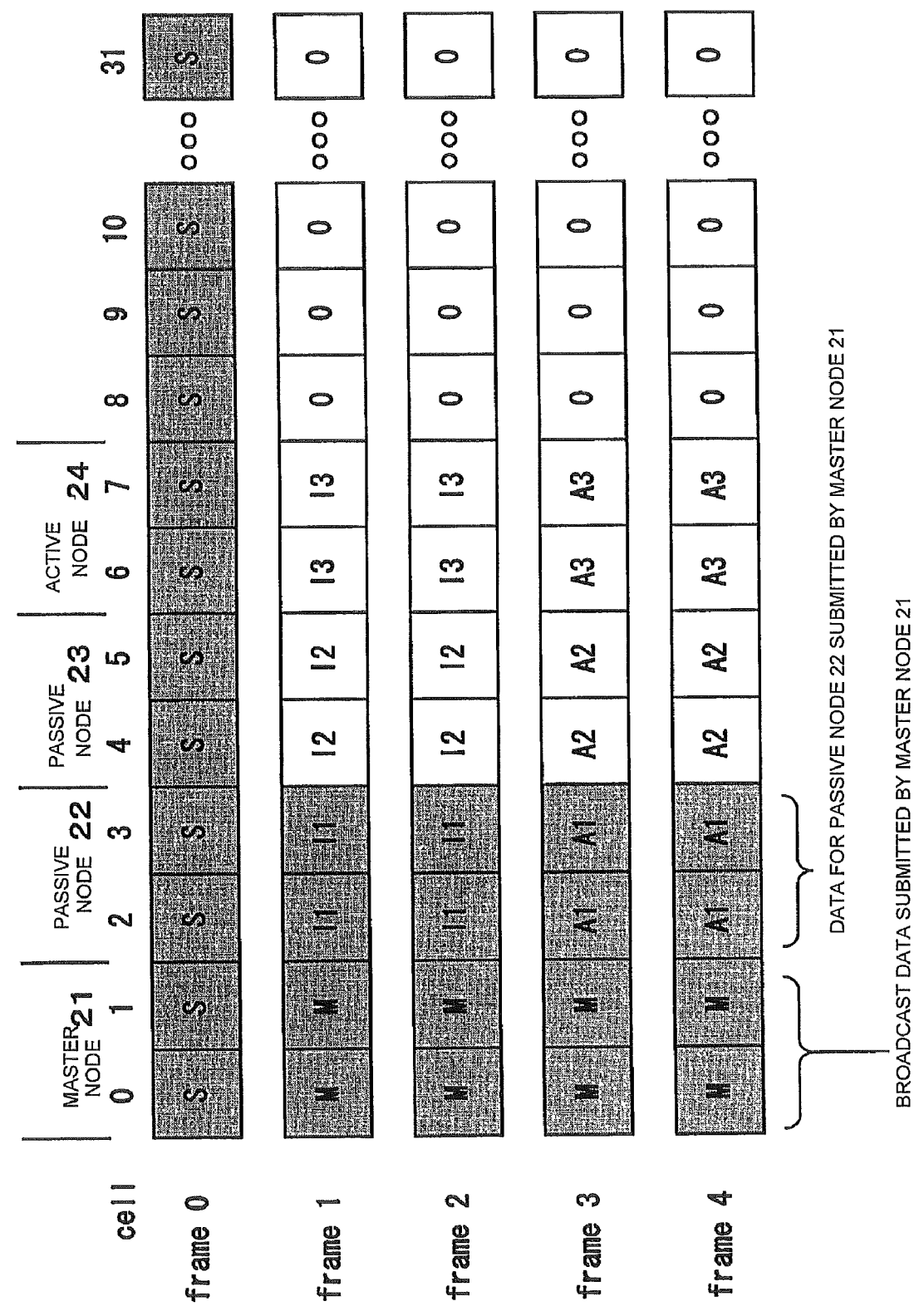

FIG. 9 is a diagram showing fixed length data a passive node 22 receives;

FIG. 12 is a diagram showing upward communication frames from an active node 24;

Figure 13:
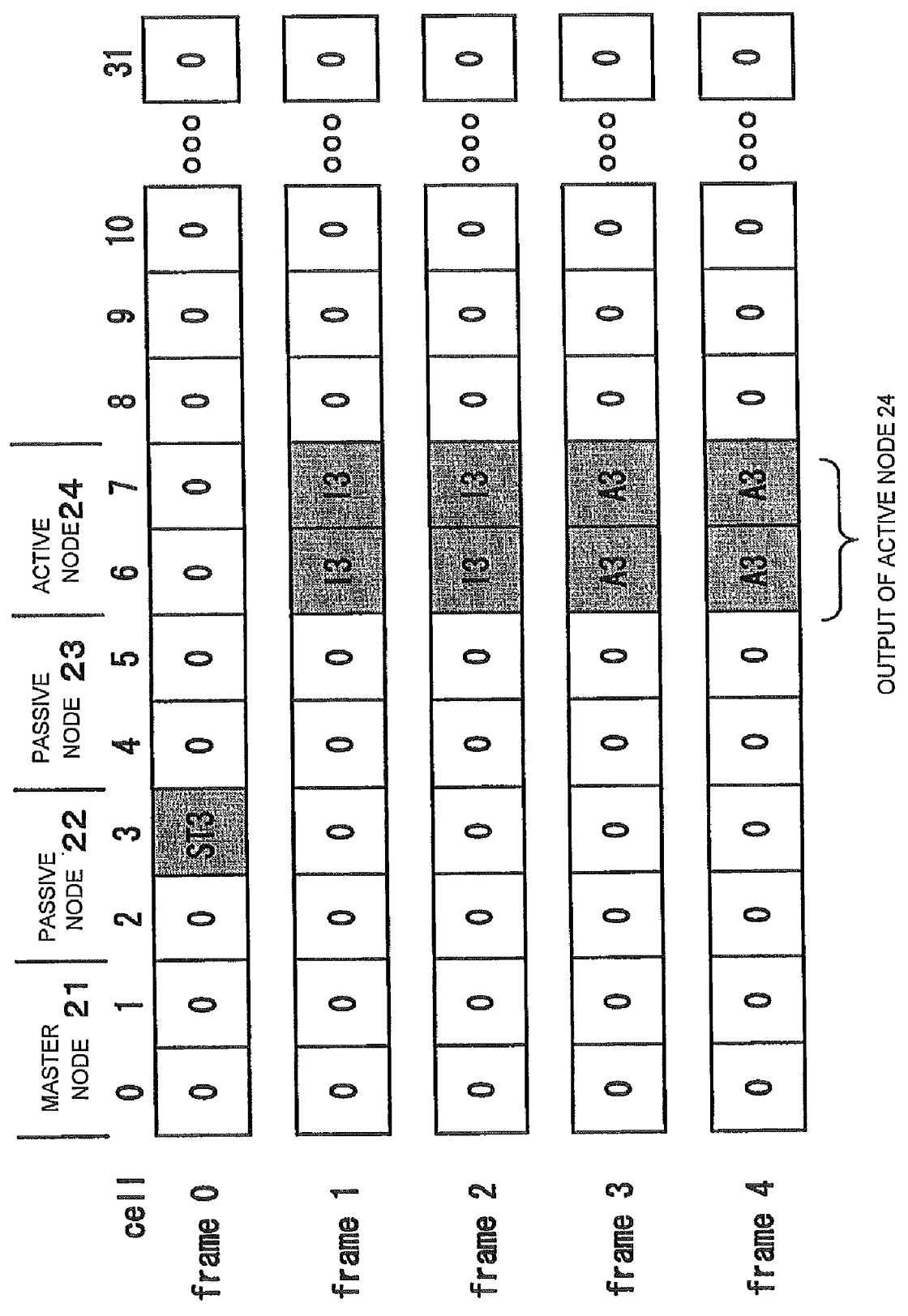

FIG. 13 is a diagram showing fixed length data the passive node 23 receives;

Figure 1:
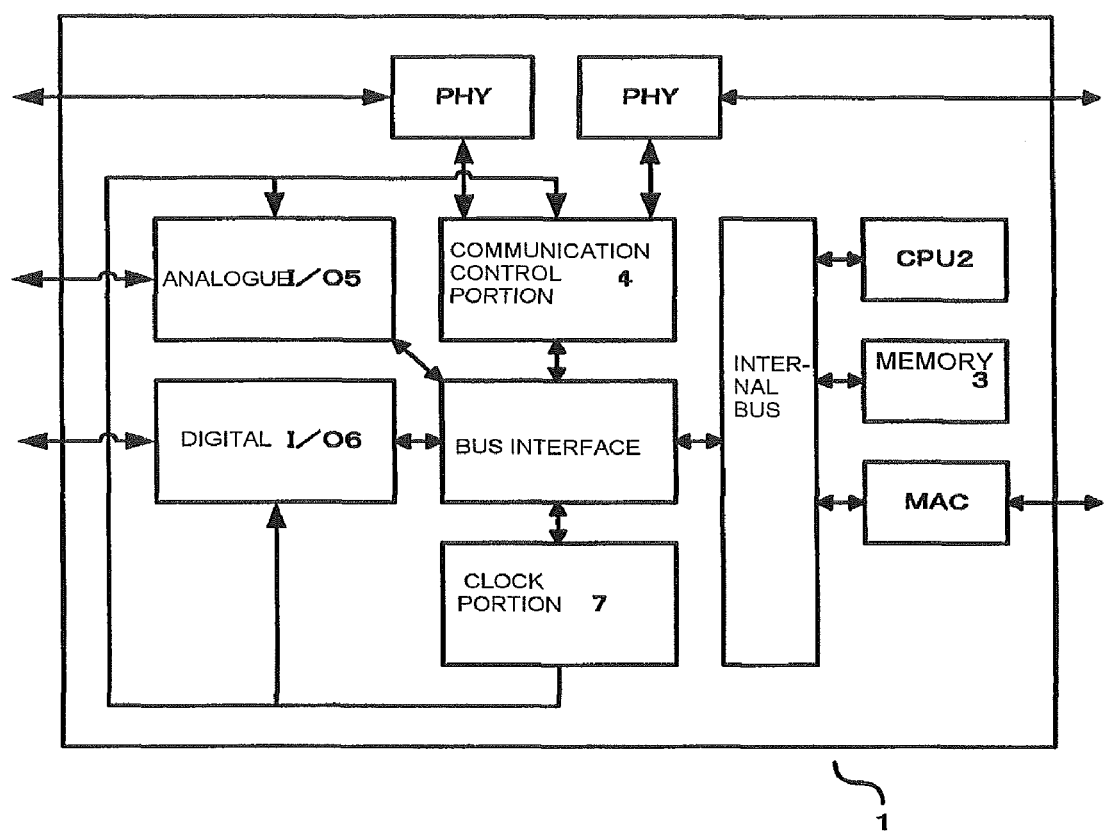
FIG. 1 is a block diagram showing hardware configuration of an I/O device according to the present invention.
Figure 2:
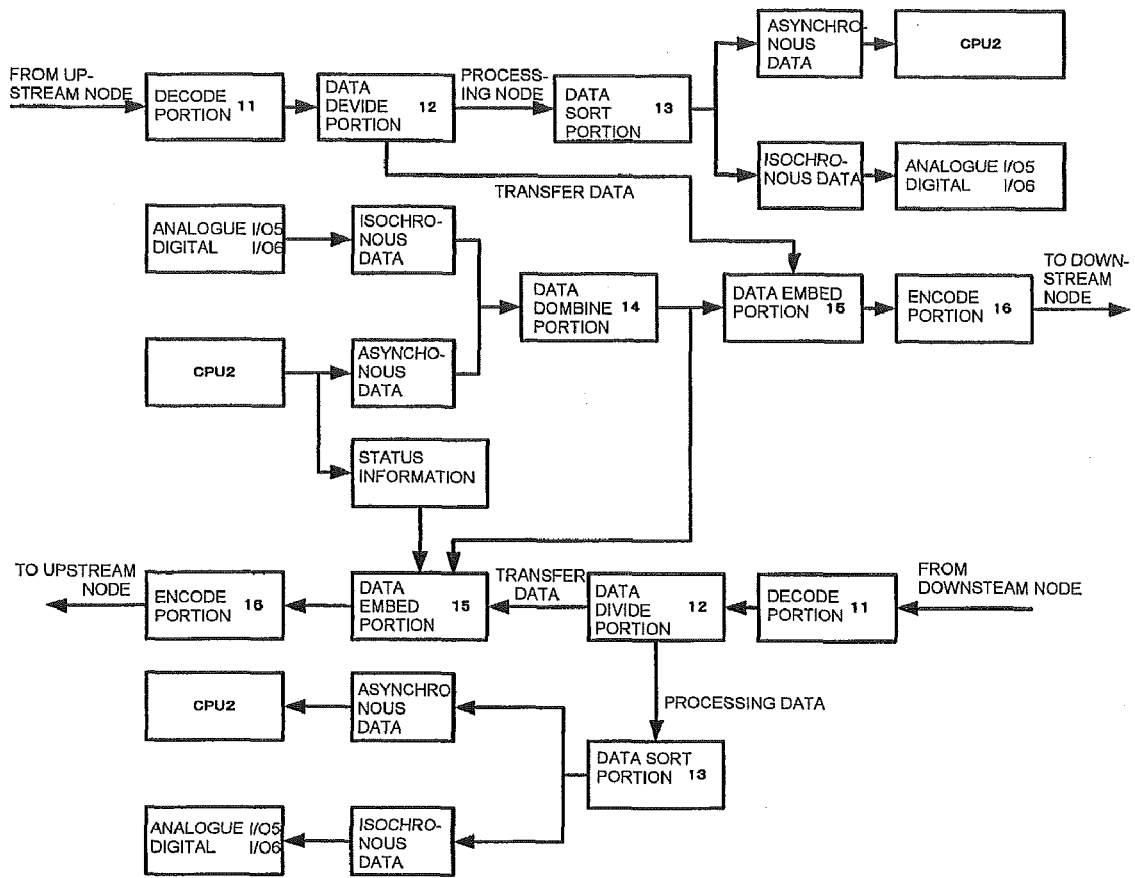
FIG. 2 is a block diagram showing steps of processes performed at a communication control portion of an I/O device.
Figure 3:
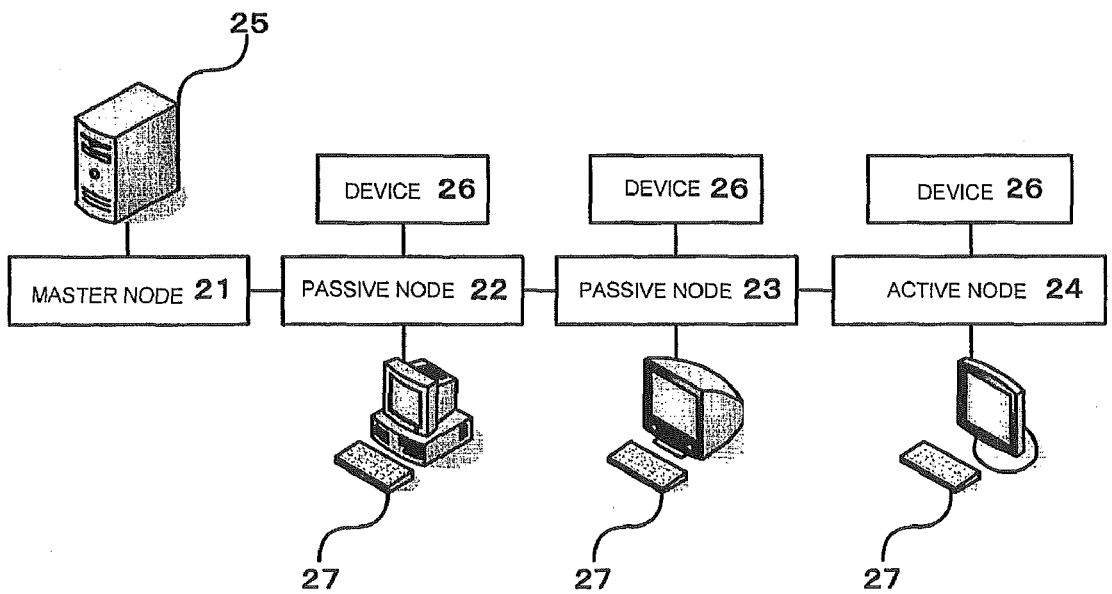
FIG. 3 is a diagram showing network configuration of a network system according to the present invention.
Figure 4:
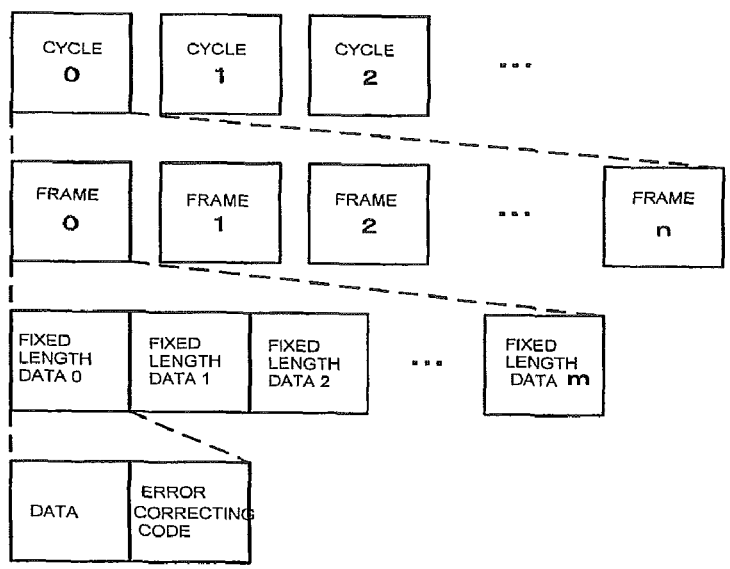
FIG. 4 is a diagram showing configuration of a communication frame in a communication method according to the present invention.
Figure 5:
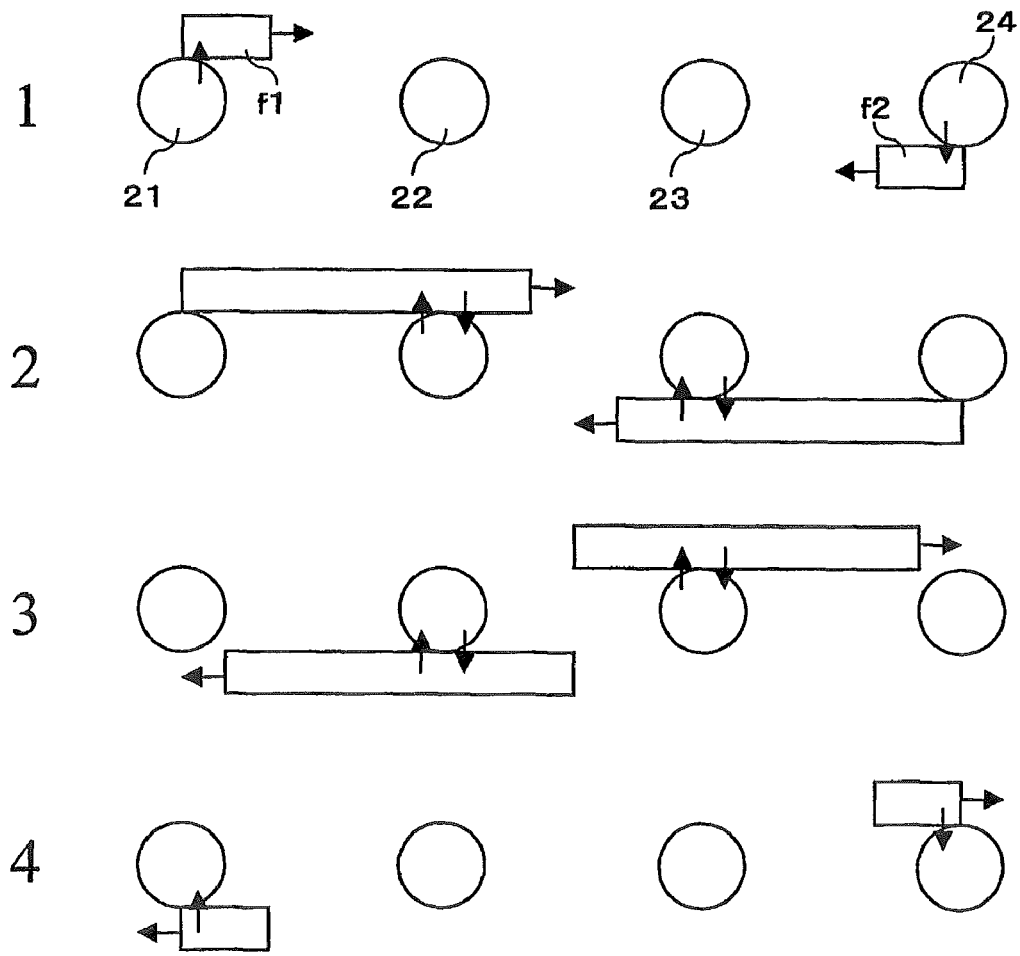
FIG. 5 is a diagram showing a general flow of a communication method according to the present invention.
Figure 6:
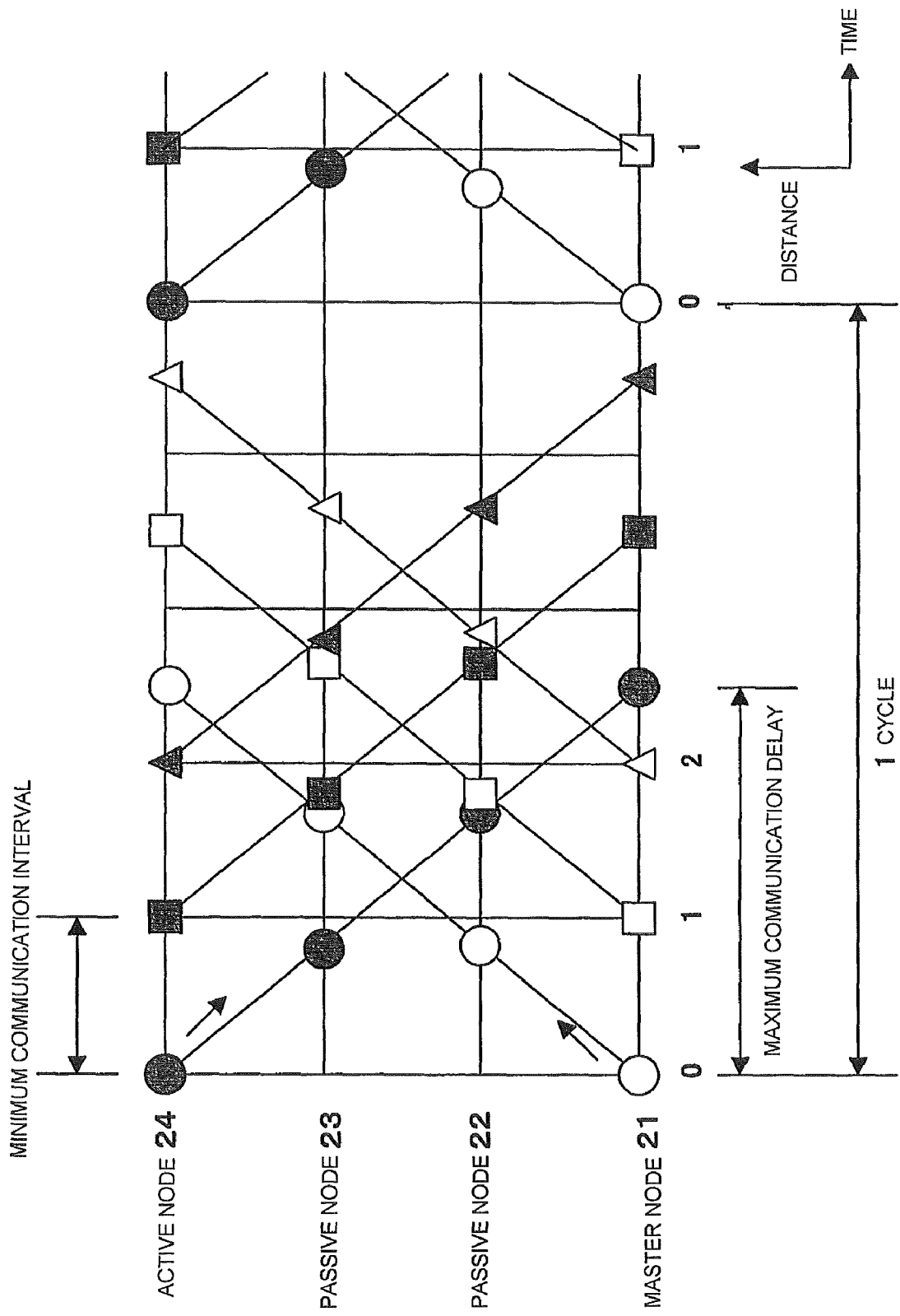
FIG. 6 is a diagram showing propagation of communication frames in one cycle.
Figure 7:
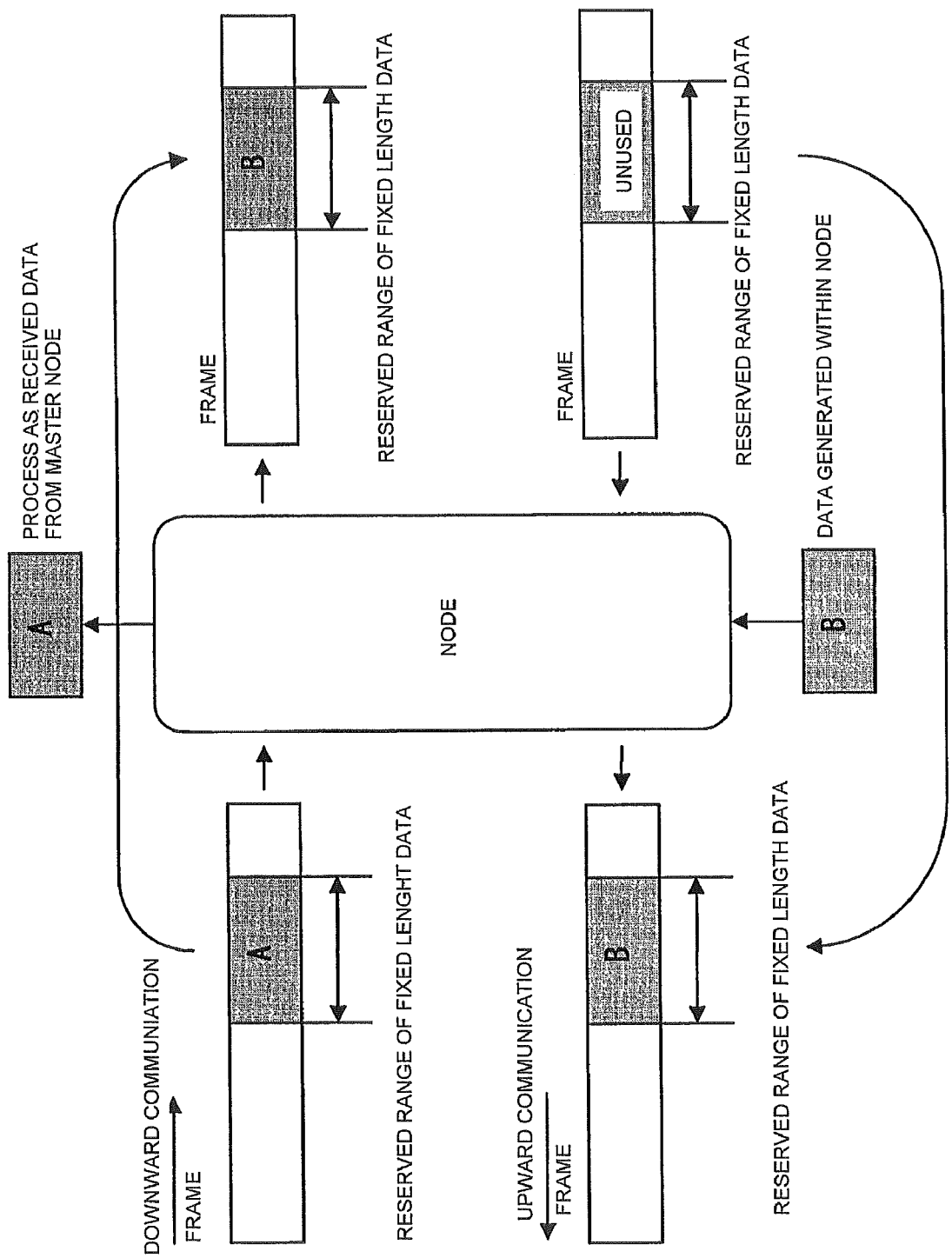
FIG. 7 is a diagram showing data processing at a passive node.
Figure 10:
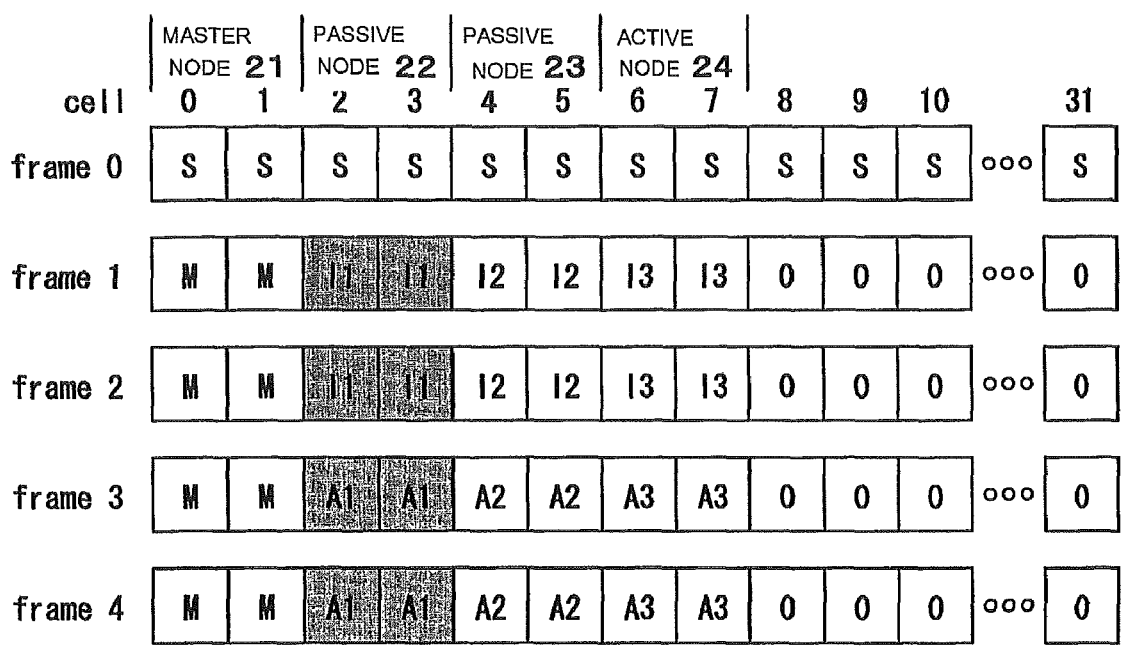
FIG. 10 is a diagram showing fixed length data the passive node 22 processes.
Figure 11:
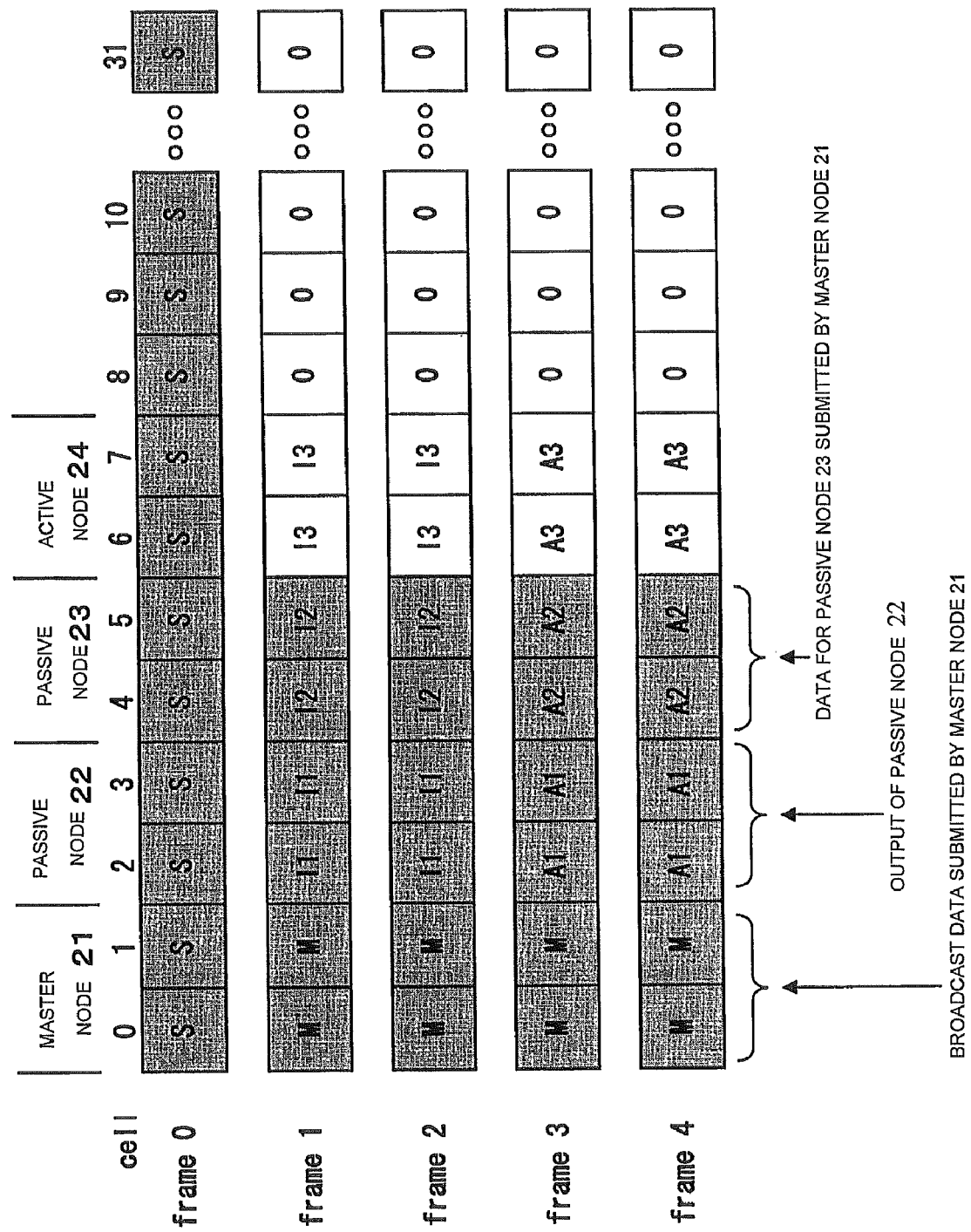
FIG. 11 is a diagram showing fixed length data a passive node 23 receives.
Figure 14:
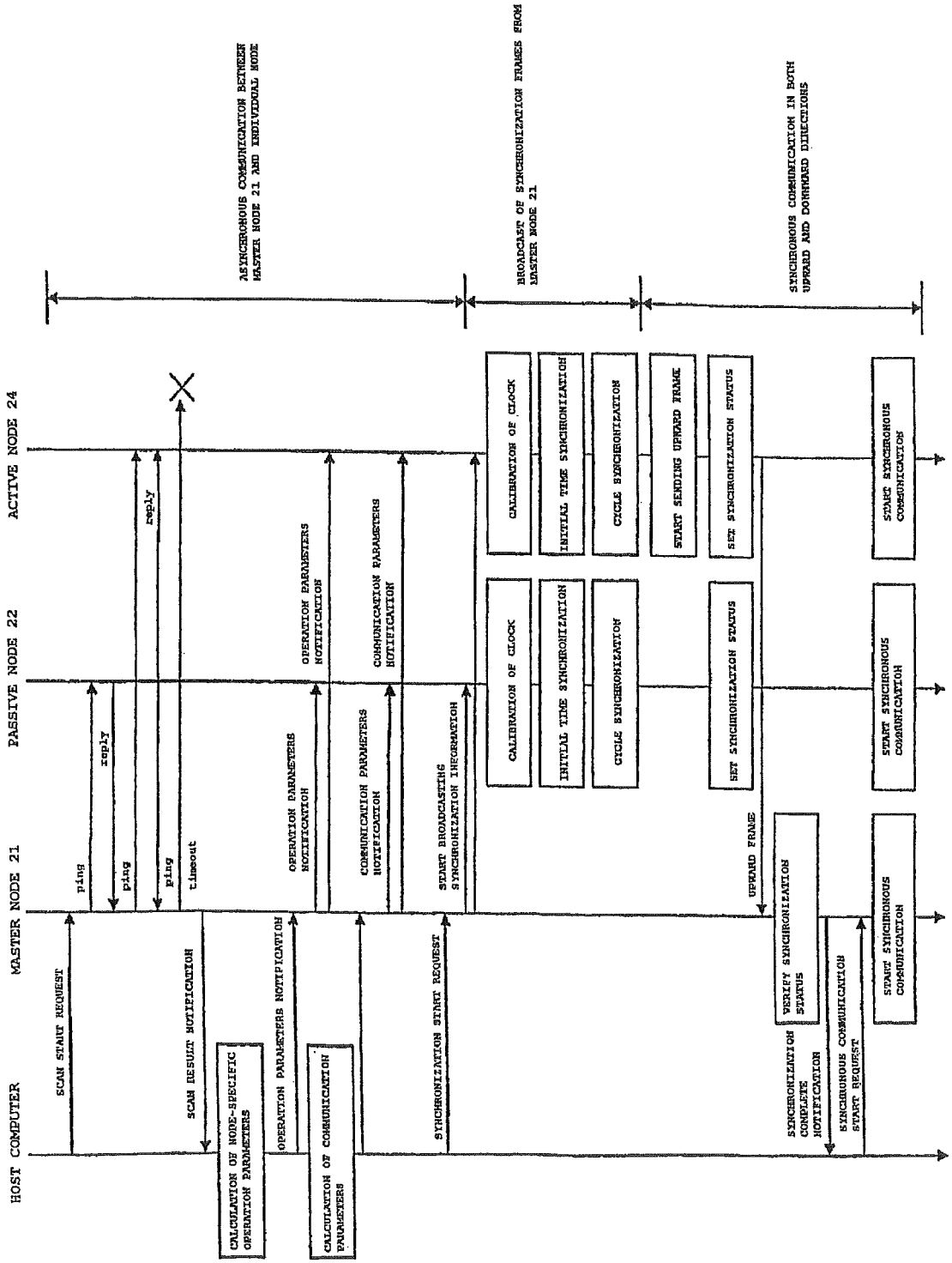
FIG. 14 is a diagram showing a flow to the start of communication in a communication method according to the present invention.
Figure 15:
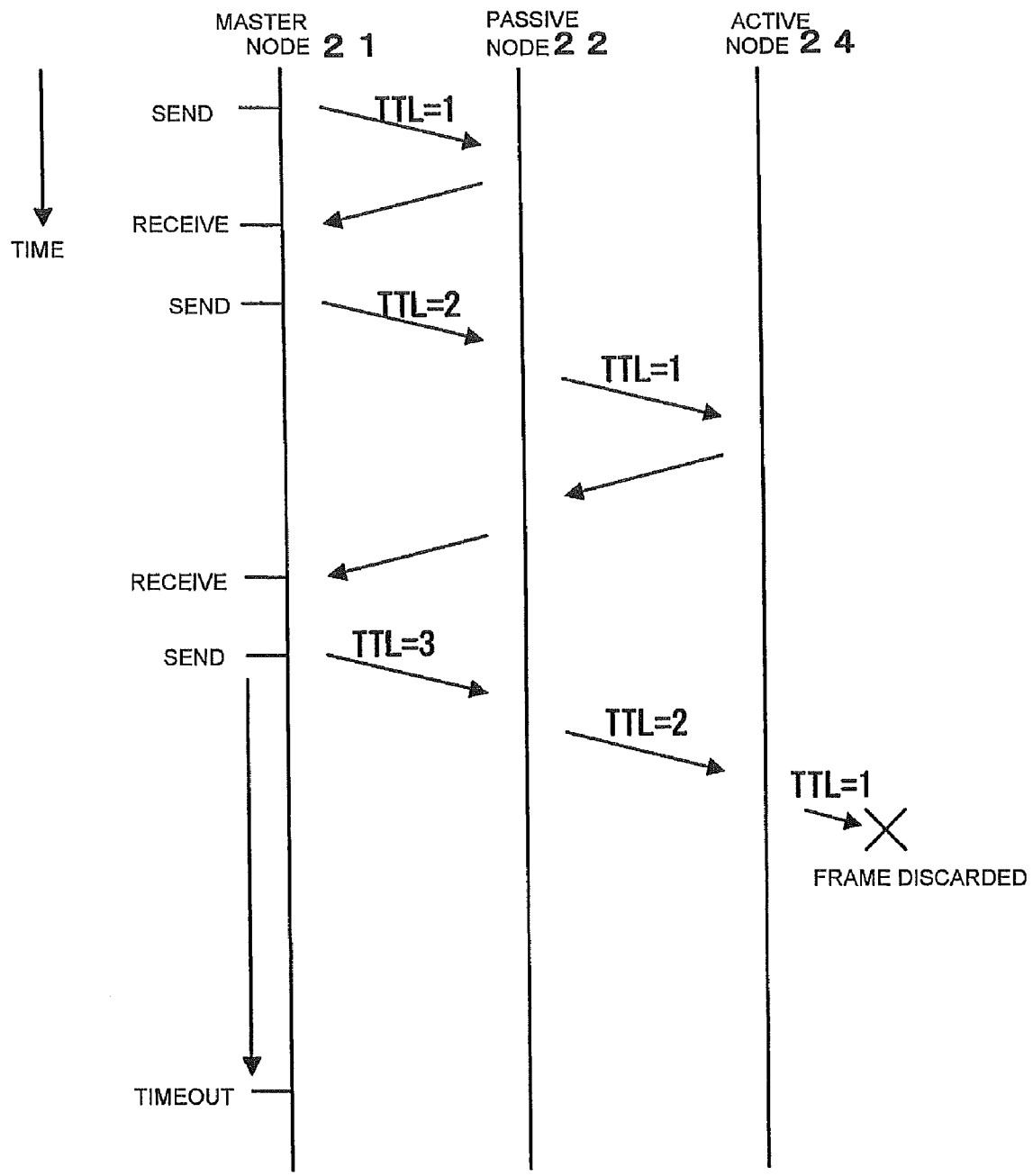
FIG. 15 is a diagram showing scanning of nodes performed by the master node 21.
Figure 16:
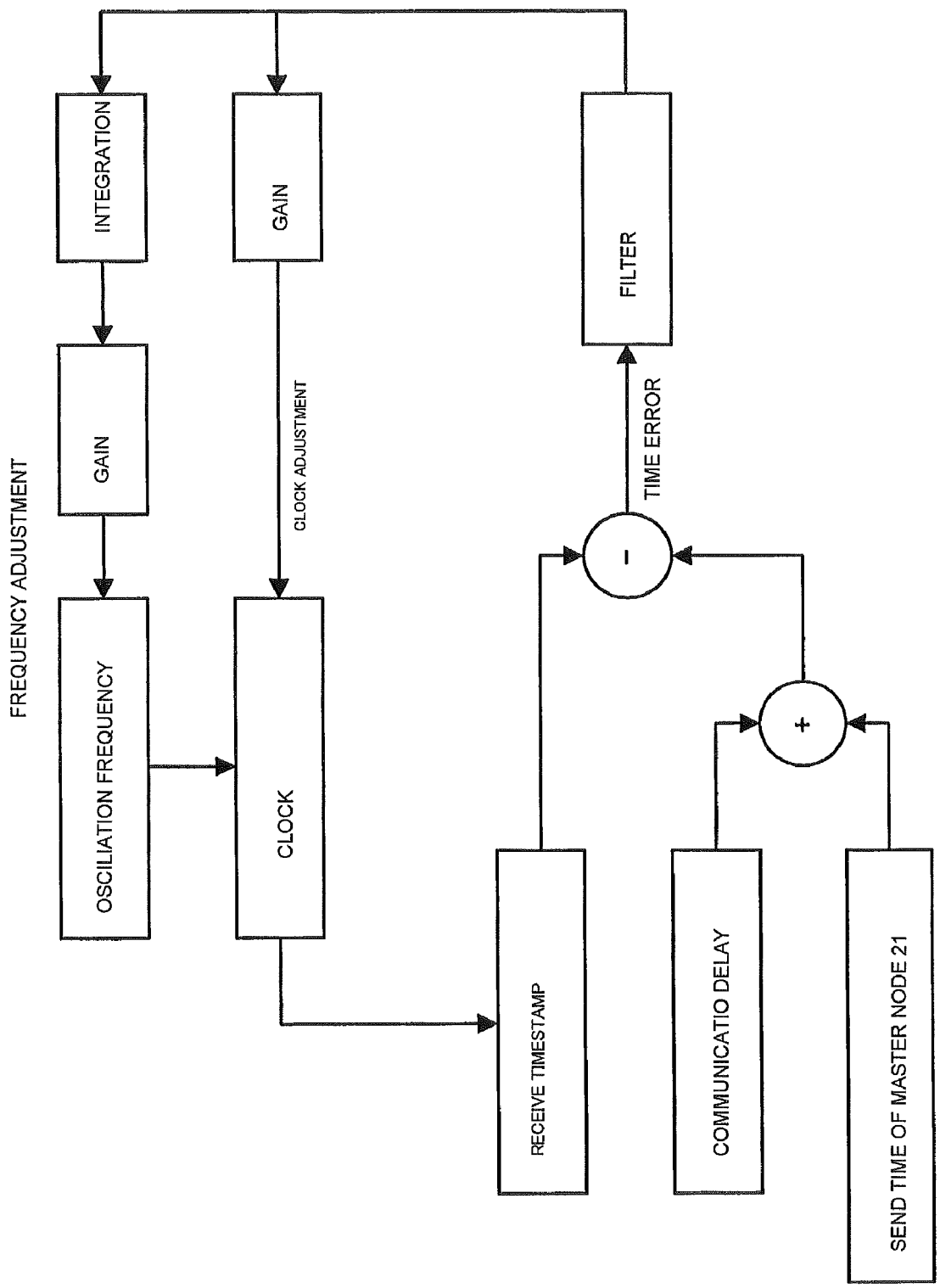
FIG. 16 is a diagram showing a time adjusting method of a clock portion of a slave node according to the present invention.
Figure 17:
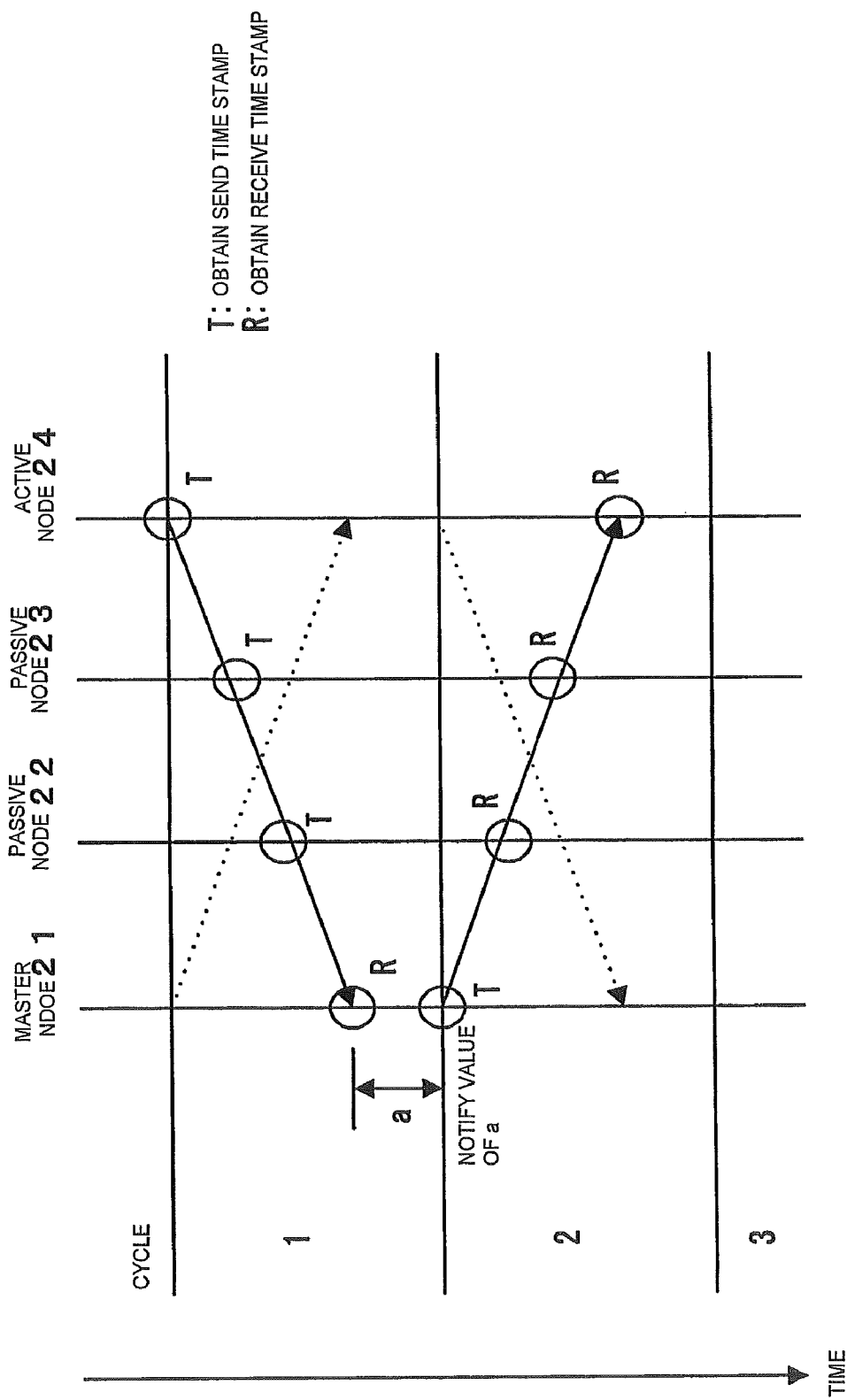
FIG. 17 is a diagram showing a communication delay measuring method used after communication started.

The invention claimed is:

1. A communication method in a network system with a plurality of I/O devices, wherein at least one of the plurality of I/O devices has a device control means for controlling an input and an output of data to a device, and the at least one of the plurality of I/O devices comprises:
   a receiving means for receiving information including at least contents instructing an input time and an output time to said plurality of I/O device;
   a time tag generating means for generating a time tag indicative of said input and said output time included in said information received at said receiving means to output the same to said device control means; and
   a clock means for outputting a clock signal indicative of a present time,
   wherein said device control means is configured to compare said input time and said output time indicated by said time tag output from said time tag generating means with the present time indicated by said clock signal output from said clock means, and wherein said device control means is configured to output designated data to said device and input data from said device at said input and said output time;
   wherein the communication method in the network system is characterized in that, the plurality of I/O devices are connected in a daisy chain, the plurality of I/O devices are classified into a master node and a plurality of slave nodes, a terminal slave node of the plurality of slave nodes is an active node and other intermediate slave nodes of the plurality of slave nodes are passive nodes, and generation of a communication frame is performed at said active node only.

2. The communication method in a network system with the plurality of I/O devices according to claim 1, wherein a communication frame generated at said master node and a communication frame generated at said terminal active node are flowed to a communication channel concurrently in opposite directions.

3. The communication method in a network system with the plurality of I/O devices according to claim 1, wherein said passives nodes each read necessary data from said communication frame passing therethrough as well as write output data thereof.

4. The communication method in a network system with the plurality of I/O devices according to claim 1, wherein said slave node internally retains time stamps of a communication frame moving back and forth between said master node and said slave node, said communication frame including time information about the difference between the time at which said communication frame is received at said master node and the time at which said communication frame is sent from said master node for next time, and said slave node calculating a communication delay between itself and said master node from time stamps of when said communication frame passed therethrough and said time information.

5. The communication method in a network system with the plurality of I/O devices according to claim 4, wherein said communication frame includes one or more fixed length data to which data and an error correcting code are appended and is processed on said fixed length data basis.

6. The communication method in a network system with the plurality of I/O devices according to claim 1, where the master node includes a clock, and wherein the one or more slave nodes include a clock synchronized with the time of the clock included in the master node.

* * * * *

UNITED STATES PATENT AND TRADEMARK OFFICE
CERTIFICATE OF CORRECTION

| | | |
|---|---|---|
| PATENT NO. | : 8,028,112 B2 | Page 1 of 1 |
| APPLICATION NO. | : 12/305026 | |
| DATED | : September 27, 2011 | |
| INVENTOR(S) | : Akihiro Amagai | |

It is certified that error appears in the above-identified patent and that said Letters Patent is hereby corrected as shown below:

On the Title page, Item (73) Assignee: delete "Sanrita" and insert -- Sanritz --.

Signed and Sealed this
Twenty-ninth Day of November, 2011

David J. Kappos
*Director of the United States Patent and Trademark Office*